United States Patent [19]
Beisang et al.

[11] 3,842,831
[45] Oct. 22, 1974

[54] CELLULAR SKIN PATCH

[75] Inventors: Arthur A. Beisang, St. Paul; Robert A. Ersek, Minneapolis, both of Minn.

[73] Assignee: Genetic Laboratories, Inc., Roseville, Minn.

[22] Filed: Aug. 6, 1973

[21] Appl. No.: 385,910

Related U.S. Application Data

[62] Division of Ser. No. 301,426, Oct. 27, 1972, Pat. No. 3,793,103.

[52] U.S. Cl. ............................. 128/155, 128/334 R
[51] Int. Cl. ............................................. A61l 15/04
[58] Field of Search ........ 128/155, 156, 305.5, 325, 128/334

[56] References Cited
UNITED STATES PATENTS

| | | | |
|---|---|---|---|
| 2,621,145 | 12/1952 | Sano | 128/155 X |
| 3,272,204 | 9/1966 | Artandi et al. | 128/334 |
| 3,723,244 | 3/1973 | Breillatt, Jr. | 128/156 X |
| 3,728,207 | 4/1973 | Heling | 128/156 X |

*Primary Examiner*—Lucie H. Laudenslager

[57] ABSTRACT

A method and means for preparing large cellular skin patches for preservation for cryogenic storage and subsequent thawing which comprises applying a woven scrim to one side of a large patch of cellular skin, with the scrim having a generally open and reticulate pattern of less than about 64 openings per square inch, and thereafter freezing the skin patch for cryogenic preservation. Large cellular skin patches are normally stored by rolling the patch prior to freezing, and for thawing, the fluid being used gains ingress to the zones between adjacent rolled layers through the reticulate pattern of the interposed scrim.

2 Claims, No Drawings

CELLULAR SKIN PATCH

CROSS-REFERENCE TO RELATED APPLICATION

This is a Division of application Ser. No. 301,426, filed Oct. 27, 1972, now U.S. Pat. No. 3,793,103.

BACKGROUND OF THE INVENTION

The present invention relates generally to an improved means and concept for preparing large cellular skin patches for preservation by cryogenic storage, and more specifically to a method and means for preparing such patches through the application of a layer of woven scrim to one side of the patch prior to rolling, cryogenic freezing and storage.

Large cellular skin patches are used for medical purposes in relatively large quantity, these patches being utilized for treatment of patients suffering from loss of skin due to a variety of causes such as, for example, burns, brasions, or the like. Skin grafting techniques have been found to aid patients toward ultimate recovery. The cellular skin is obtained from swine, human cadavers, or natural donors. Accordingly, the size of the individual patch will frequently be limited and in order to overcome the size limitation, the individual small patches may be secured together to obtain relatively large patches or sheets.

In the event fresh skin is utilized, its shelf-life is quite limited, normally being less than about 15 days. It has been found that skin may be cryogenically preserved for relatively extended periods of time, and thawed immediately prior to use. One of the disadvantages from the cryogenic preservation is that the skin suffers damage whenever the thawing time is greater than approximately one minute. If the thawing time can be rendered rapid, that is, less than one minute, the skin will be essentially as acceptable as freshly obtained skin. The present invention provides a system for cryogenically preserving skin and arranging for rapid thawing of the cryogenically preserved skin.

SUMMARY OF THE INVENTION

In accordance with the present invention, stated briefly, the individual patches are preferably coupled together to form relatively large sheets of skin, with these sheets being provided with a scrim backing. The scrim has a generally open and reticulate pattern with less than about 64 openings per square inch, thus providing a regular spacing between the surfaces of mutually adjacently disposed layers of rolled sheet, with this spacing permitting ease of ingress to the contacting fluid used for thawing the material prior to use. The scrim is preferably fabricated from nylon or polyethylene terephthalate threads, these threads being generally non-hygroscopic in nature and hence useful for contact with thawing fluids such as saline solutions or the like.

Thus, the concept involves the initial preparation of large patches or sheets of cellular skin, with these patches being provided with a woven scrim backing, preferably adhesively secured or applied to the skin surface. Thereafter, the scrim-backed material is sterilized, rolled for storage, and cryogenically frozen. The cryogenically frozen material can be retained until required for use, at which time it is thawed and applied to a patient where indicated.

Therefore, it is a primary object of the present invention to provide an improved method and means for preparing relatively large cellular skin patches for preservation by cryogenic storage and subsequent thawing which comprises applying the woven scrim to one side of a large patch of cellular skin prior to cryogenic freezing.

It is yet a further object of the present invention to provide an improved method and means for preparing large cellular skin patches for preservation for cryogenic storage wherein the patches are provided with a backing of a woven scrim having a generally open and reticulate pattern with less than about 64 openings per square inch.

It is yet a further object of the present invention to provide an improved method for preparing large cellular skin patches for preservation by cryogenic storage wherein the patches are provided with a woven scrim backing with relatively large openings in the backing, and wherein the scrim is prepared from non-hygroscopic threads of synthetic resin such as nylon or the like.

Other and further objects of the present invention will become apparent to those skilled in the art upon a study of the following specification and appended claims.

DESCRIPTION OF THE PREFERRED EMBODIMENT

In accordance with the preferred embodiment of the present invention, a method and means for preparing large cellular skin patches or sheets for preservation by cryogenic storage and subsequent thawing is provided. Specifically, these patches are obtained by suitable extraction from swine, human cadavers, or donors, with the size of the individual patches normally being somewhat limited. For normal medical procedures, the large patches or sheets which are preserved for subsequent use are normally of a size of 10–15 inches. These individual sheets may comprise several individual patches secured together by sewing along the edges or by adhesive bonding techniques. When adhesives are employed, one suitable adhesive is iso-fluoro cyanoacrylate, which is a normally commercially available adhesive. Other cyanoacrylates may be employed, specifically those having received approval for such use.

The individual large patches or sheets are then treated so as to apply a woven scrim to one side of the patch, with the woven scrim being one with a generally reticulate pattern, preferably having less than about 64 openings per square inch. Such a loose weave is desirable in order to permit ease of ingress of the contact solution being used for thawing purposes, and to prevent or limit surface-to-surface contact zones with the skin. The adhesive employed to bond the scrim to the skin is preferably one of approved formulation, such as, for example, the iso-fluoro-cyanoacrylate previously discussed.

It will be further appreciated that the term "woven" is being employed in a comprehensive sense, and the scrim utilized may or may not be one which carries a traditionally "woven pattern." In other words, the scrim may be prepared or selected from the non-woven varieties which are adhesively secured together so as to form the conventionally generally reticulate pattern.

The scrim is prepared from a material which is capable of withstanding exposure to normal saline solutions.

In this connection, nylon or polyethylene terephthalate fibers may be employed. Nylon is commercially available, and polyethylene terephthalate woven fibers are commercially available under the tradename "Dacron" as well as others. These materials are each non-hygroscopic and accordingly are capable of withstanding exposure to the saline solutions employed for achieving rapid thawing of the cryogenically preserved material.

For cryogenic preservation, the substance is exposed to cryogenic temperatures in the range of from between about −70° C. and lower. Such cryogenic storage facilities are, of course, available commercially.

In order to provide appropriate sterilization of the skin and applied scrim, exposure to the standard ethylene oxide environments are preferred. Such sterilization facilities are likewise commercially available and widely practiced in the art at this time.

The individual cryogenically preserved cellular skin patches or sheets are preferably in a substantially hermetic enclosure, although, if desired, standard film envelope receptacles may be utilized.

For thawing, the previously prepared and cryogenically preserved cellular skin patches or sheets are immersed in a relatively large tank of normal saline solution. The volume of the tank will be sufficiently large so as to accommodate the rapid thaw of the cellular skin patch or sheet without suffering from a significant drop in temperature. The skin patch or sheet is brought to room temperature in a period of less than about one minute in order to minimize or at least reduce the exposure to cellular damage.

It has been indicated that the skin patches or sheets which are normally treated by the method and means of the present invention have substantial length and width dimensions. In this connection, reference is being made to those sheets which are normally employed in the practice in this time having dimensions of, for example, approximately 10 inches × 15 inches. It is this size of sheet which inhibits the passage of the contact fluid between mutually adjacent surfaces so as to prevent rapid thawing, and thus exposing the structure to the risk of cellular damage due to slow thaw.

It is sometimes desirable that the cellular skin patch or sheet be exposed to a cryophylactic or cryoprotectant agent. These agents are, of course, commercially available and may be formulated from DMSO or glycerin. It will be appreciated that fresh frozen skin may be packaged without requiring a cryophylactic or cryoprotectant agent, however they may be used if deemed desirable, and the method and means of the present invention find utility in either instance.

We claim:

1. Cellular skin patches arranged for cryogenic storage and comprising:
   a. a skin patch consisting of an integral cohesive natural cellular skin layer having substantial length and width dimensions; and
   b. scrim means secured to one surface thereof and comprising a generally loose woven thread scrim having less than about 64 openings per square inch.

2. The cellular skin patch as defined in claim 1 being particularly characterized in that said scrim is fabricated from fibers consisting of synthetic resin selected from the group consisting of nylon and polyethylene terephthalate.

* * * * *